United States Patent [19]

Pantzar

[11] Patent Number: 5,199,827
[45] Date of Patent: Apr. 6, 1993

[54] CUTTING INSERT AND CUTTING TOOL FOR CHIP REMOVING MACHINING

[75] Inventor: Göran Pantzar, Årsunda, Sweden

[73] Assignee: Sandvik AB, Sandviken, Sweden

[21] Appl. No.: 801,873

[22] Filed: Dec. 3, 1991

[30] Foreign Application Priority Data

Dec. 3, 1990 [SE] Sweden .............................. 9003827-4

[51] Int. Cl.$^5$ ................................................ B23C 5/20
[52] U.S. Cl. ...................................... 407/42; 407/114; 407/116
[58] Field of Search ................... 407/34, 42, 113-116, 407/53, 56, 61

[56] References Cited

U.S. PATENT DOCUMENTS

| 3,751,782 | 8/1973 | Fruish . | |
|---|---|---|---|
| 3,955,259 | 5/1976 | Gustafsson . | |
| 4,033,018 | 7/1977 | Bloink . | |
| 4,074,949 | 2/1978 | Hochmuth et al. | 407/114 |
| 4,294,565 | 10/1981 | Erkfritz | 407/113 |
| 4,632,607 | 12/1986 | Pantzar | 407/113 |
| 4,755,086 | 7/1988 | Stashko | 407/114 |
| 4,893,969 | 1/1990 | Hessman et al. | 407/114 |
| 5,006,020 | 4/1991 | Roos | 407/113 |
| 5,052,863 | 10/1991 | Satran | 407/114 X |
| 5,078,550 | 1/1992 | Satran et al. | 407/34 |

*Primary Examiner*—Steven C. Bishop
*Attorney, Agent, or Firm*—Burns, Doane, Swecker & Mathis

[57] ABSTRACT

An insert for a milling cutter has a chip face and a bottom face which are interconnected by side surfaces. The intersection of side surfaces with the chip face forms four cutting edges. Each side surface is beveled at its intersection with a cutting edge to form a planar clearance face, the width of which increases toward one of the cutting corners. Each cutting edge includes a main edge portion, a corner edge portion, and a secondary edge portion. Each secondary edge portion extends inwardly from an associated secondary edge at an angle no greater than four degrees. At each corner, a secondary edge portion of one cutting edge forms an actual angle with a main edge portion of another cutting edge greater than ninety degrees. The insert is mounted at a negative radial rake and a positive axial rake such that such actual angle presents to a workpiece an effective angle of ninety degrees to cut a ninety degree shoulder in the workpiece.

23 Claims, 4 Drawing Sheets

CUTTING INSERT AND CUTTING TOOL FOR CHIP REMOVING MACHINING

BACKGROUND OF THE INVENTION

The present invention relates to an indexable cutting insert for chip cutting machining comprising a body of generally polygonal shape having an upper chip face, an opposite planar bottom face and side surfaces therebetween intersecting the upper chip face to define main cutting edges therewith. The invention also relates to a 90° shoulder mill equipped with such indexable inserts.

A prior art insert of the afore-mentioned type to be mounted in milling cutters of radial negative and axially positive cutting angle is disclosed for instance in Swedish Patent Publication No. 419,834, corresponding to U.S. Pat. No. 3,955,259. When milling with such inserts is carried out, however, the chip formation has not always been satisfactory under certain conditions. Also, with such milling cutters the desired cutting depth has not been achieved, especially with 90° shoulder mills, due to the fact that the required large positive chip angle could not be used with such inserts having four main cutting edges.

It is an object of the present invention to provide an indexable cutting insert that enables 90° shoulder milling operations to be carried out with a positive chip angle. A further object is to provide such an insert which has four indexable cutting edges.

It is another object of the invention to provide an insert that reduces the energy needed for its engagement with a workpiece.

It is yet another object of the invention to provide an insert whose lifetime can be maximized.

SUMMARY OF THE INVENTION

The present invention relates to a cutting insert and to a milling cutter containing such an insert. The cutting insert includes a body having a polygonal upper chip face, a substantially planar bottom face, and side surfaces interconnecting one another to form corners of the insert and intersecting the chip face and the bottom face. Cutting edges are formed by the intersection of the chip face with respective side surfaces. A lower portion of each side surface extends upwardly and outwardly from the bottom face. An upper portion of each side surface is beveled to form a planar clearance face which intersects a respective cutting edge. Each clearance face is disposed between two adjacent corners and has a width extending in a direction transversely of the cutting edge. The width is largest adjacent one of the two corners and decreases toward the other of the two corners.

Preferably, the wider end of the clearance face extends around one of the corners and is smoothly rounded at such corner.

Preferably, the insert includes a strengthening land extending inwardly from the cutting edge.

A central portion of the chip face is preferably recessed toward the bottom face. The chip face includes descending walls extending downwardly from the lands to the recessed central portion. The descending walls are separated from one another by raised ribs. The ribs are situated adjacent respective corners and include upper surfaces lying in a common plane oriented parallel to the bottom face.

The bottom face is preferably polygonal and angularly displaced relative to the polygonal chip face as the insert is viewed in plan.

The cutting edges preferably include main edge portions, corner edge portions, and secondary edge portions. Each secondary edge portion interconnects a main edge portion with a corner edge portion. The main edge portion is inclined inwardly relative to a respective secondary edge portion to form an acute angle therewith. That angle is no greater than about 4°. The insert has four corners, each adjoining a secondary edge portion and a main edge portion.

A secondary edge portion located on one side of a corner of the insert forms an actual angle with a main edge portion located on an opposite side of the corner, which angle is greater than ninety degrees. The insert is mounted in a cutter body at a negative radial rake angle and a positive axial rake angle such that the main and secondary edge portions located at a respective corner form an effective angle of ninety degrees with one another as seen by a workpiece, in order to cut a ninety degree shoulder in the workpiece.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION OF PREFERRED EMBODIMENTS OF THE INVENTION

Figure 1:
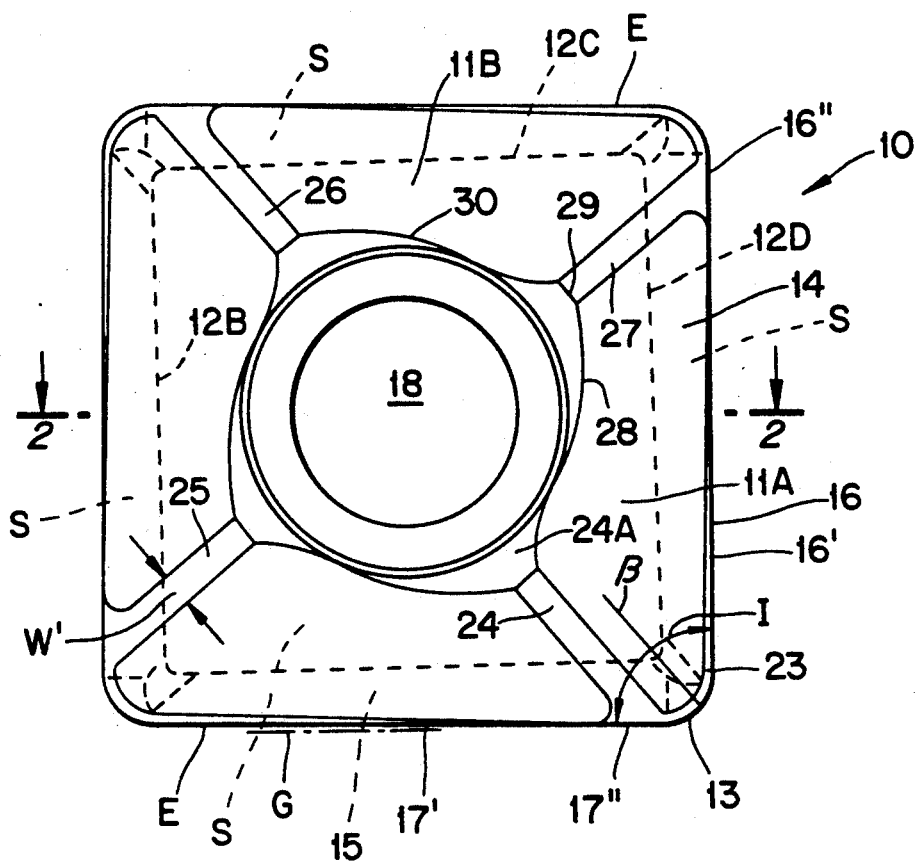
FIG. 1 is a plan view of an insert according to the invention.

The insert shown in FIGS. 1-5 is an indexable polygonal insert 10 of square shape. It is to be understood that other polygonal shapes can be used within the scope of this invention. The insert 10 comprises an upper chip face 11, an opposite planar bottom face 12 bordered by edges 12A, 12B, 12C, 12D, and four identical side surfaces S intersecting the upper and bottom surfaces to form cutting edges E. Two of the side surfaces extending to a cutting corner 13 are designated as surfaces 14 and 15 in the drawings, and those two surfaces form two cutting edges 16 and 17, respectively (see FIG. 3).

Figure 2:
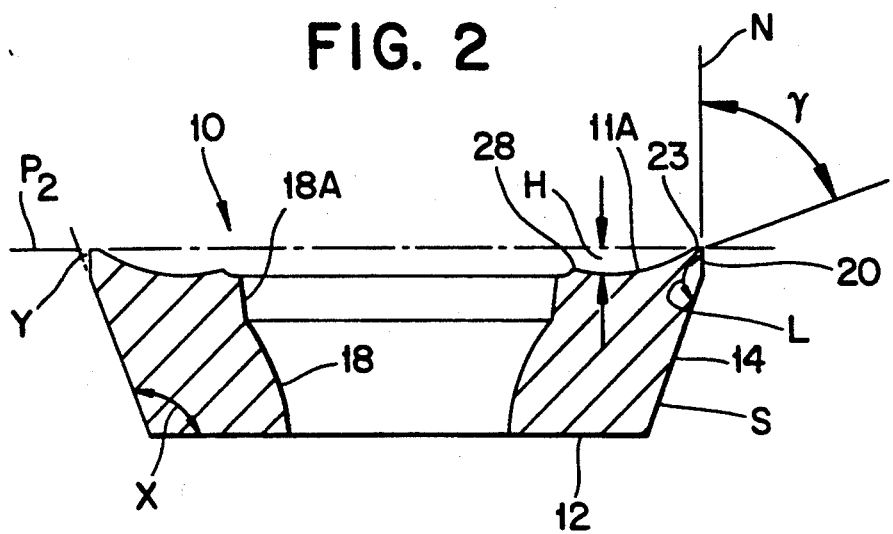
FIG. 2 is a cross-sectional view taken along the line 2—2 in FIG. 1.

The insert has a positive geometry which means that the side surfaces intersect the bottom surface 12 at obtuse angles X while intersecting an upper plane $P_2$ of the upper face 11 at an acute angle Y (see FIG. 2).

A central aperture 18 is provided which extends through both of the upper and bottom faces 11 and 12 and is oriented perpendicularly to the bottom face 12.

The central aperture is intended for the receipt of a suitable fastener such as a screw.

The bottom face 12 has a polygonal shape, which is angularly displaced relative to the polygonal shape of the upper face 11 about the axis of the hole 18, i.e., as viewed in plan (FIG. 1).

Each cutting edge E includes a main edge portion, a corner edge portion, and a secondary edge portion interconnecting the main and corner cutting edge portions. Thus, for example, the cutting edge 17 includes a main cutting edge portion 17', a secondary edge portion 17'', and a corner edge portion 17'''. The cutting edge 16 includes similar portions 16', 16'', 16'''. The main edge portion 17' extends slightly inwardly from the associated secondary edge portion 17'' (i.e., toward the center of the insert) at a very slight angle G (see FIG. 1) which is in the range of 0.5 to 4.0°. Therefore, for example, in the case of an angle G of 4.0°, the actual angle I (see FIG. 1) formed between the secondary edge portion 17'' located on one side of the corner 13 and the main edge portion 1G' located on the opposite side of the corner 13 is 94°. The secondary edge portion 17'' extends into the smoothly rounded corner cutting edge portion 17'''. Instead of being smoothly rounded, the corner edge portion could be constituted by a number of small facets.

Figure 2A:
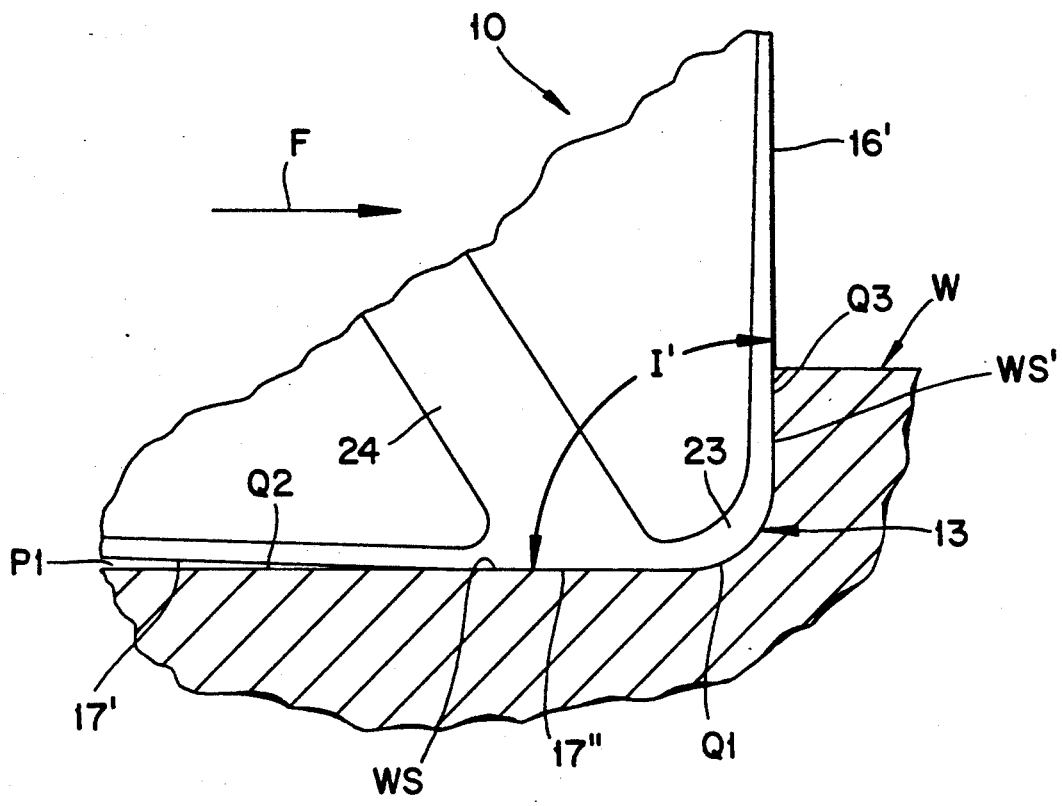
FIG. 2A is an enlarged fragmentary view of an insert cutting through a workpiece.
Figure 3:
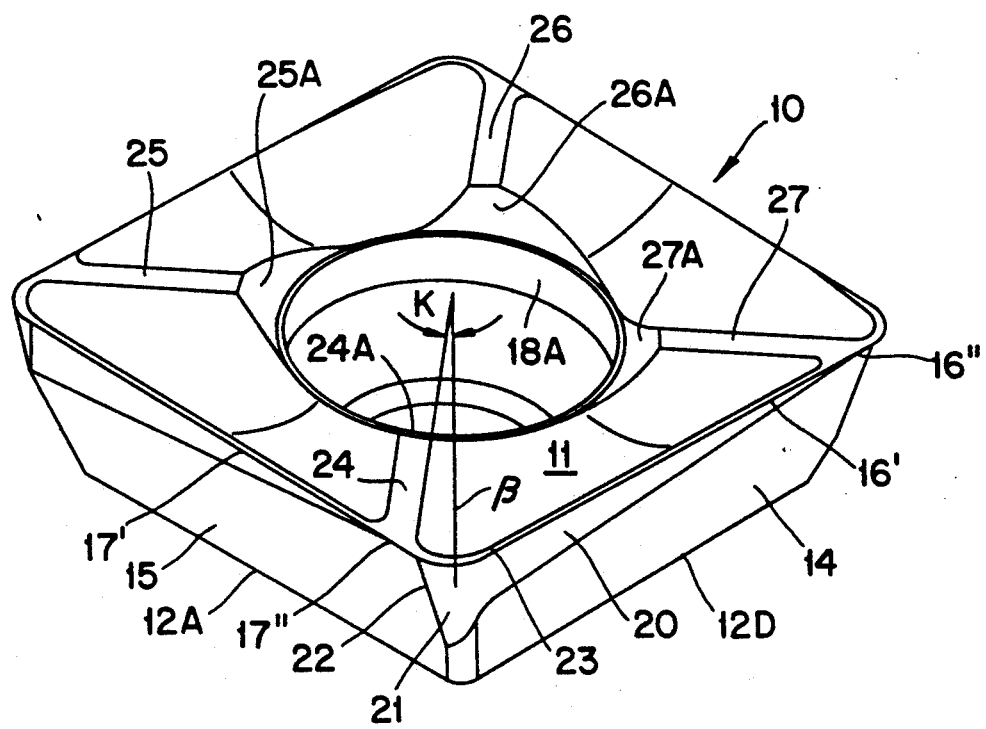
FIG. 3 is a perspective view of the insert shown in FIG. 1.
Figure 4:
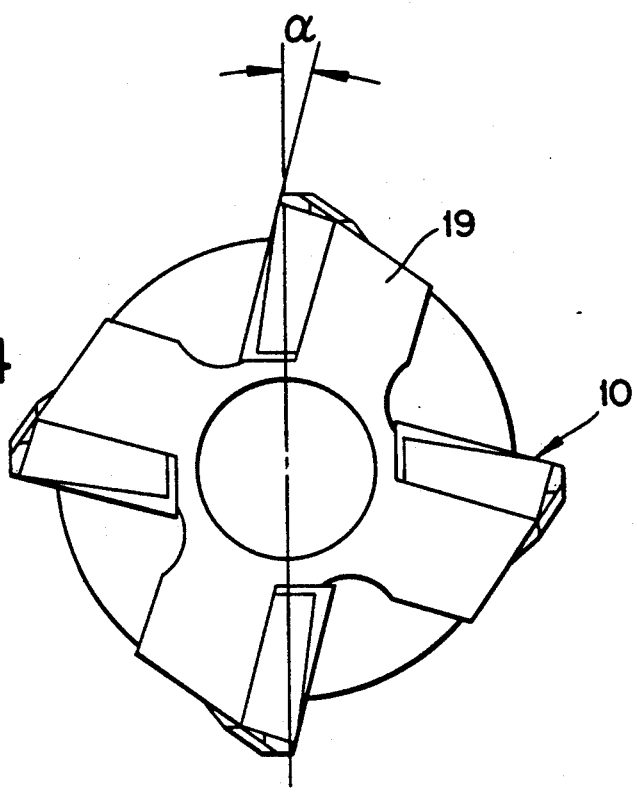
FIG. 4 is an end view of a shoulder milling cutter equipped with inserts as shown in FIGS. 1-3.
Figure 5:
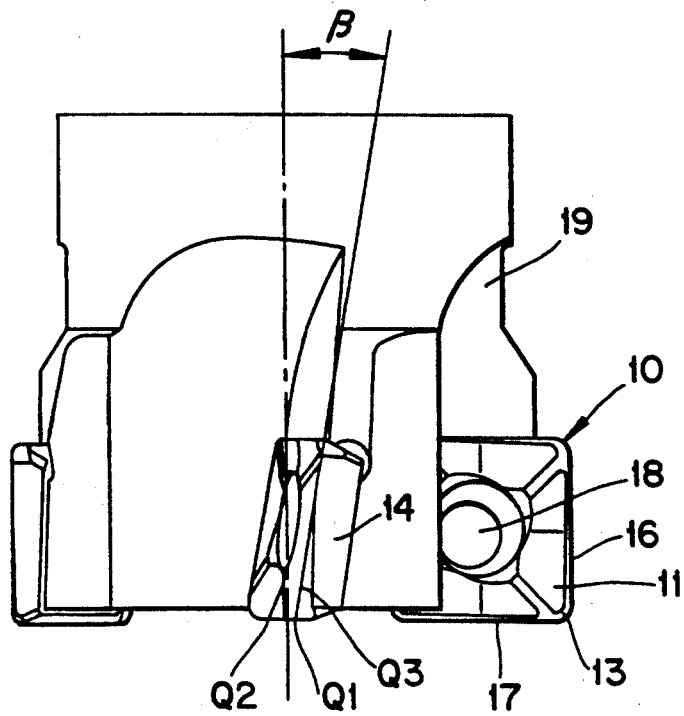
FIG. 5 is a side view of the milling cutter shown in FIG. 4.

Each edge 12A-D of the bottom face 12 extends parallel with a respective secondary cutting edge 17'', i.e., edge 12A is parallel to secondary edge portion 17'' (see FIG. 1). Accordingly, the secondary edge portion will generate the surface WS of the workpiece with which the insert is in engagement (see FIG. 2A). The edge 12A forms an acute angle with the main cutting edge 17' (as viewed in plan (FIG. 1 ).

The insert 10 is, along a major portion of its side surface S, provided with a bevel which forms a planar clearance face 20. The clearance face 20 is situated between two respective corners 3 and has a width dimension extending perpendicularly relative to the respective cutting edge. The width increases progressively towards one cutting corner 13 and extends smoothly around such cutting corner. The clearance face 20 is oriented in a plane that extends perpendicularly to the plane $P_2$, while intersecting with the rest of edge surface S at an obtuse angle L (see FIG. 2). At the corner 13, the clearance face 20 extends into a convexly rounded surface 21 having a radius R which then extends to the adjacent side surface S to form therewith an intersection line. For example, the clearance face 20 of side surface 14 extends into a convexly rounded surface 21 at the corner 13, and then extends to the adjacent side surface 15 to form therewith an intersection line 22.

The intersection line 22 is oriented obliquely in relation to the adjacent upper cutting edge 17.

The clearance face 20 extends to an upper strengthening land 23. The land 23 has a maximum width at the cutting corner 13. This can be achieved by a land which is of constant width except at the corner where it expands, or by a land of continuously increasing width as shown. The land 23 is located in the same plane as four raised surface portions 24, 25, 26, 27, which are raised from inner portions of the upper surface 11. Each of these raised surface portions 24-27 extends from an edge towards the upper end of the central aperture 18 and is symmetric relative to the respective corner 13 in that it is located at some distance from a bisector B of the corner. More specifically, each such raised portion 24 forms an angle K with the bisector B (see FIG. 3), the angle preferably being 0°-20°. Each raised surface portion 24-27 has a constant width W' (see FIG. 1) although the width could vary under certain conditions.

The surface area 11A located between two adjacent raised surface portions 24 and 27 is a recess which is concave in cross-section. A chip angle $\gamma$ is thus provided between the surface 11 close to cutting edge 16 and a normal N to the plane $P_2$ (see FIG. 2), which is preferably in the range of 60°-85°. Close to the insert's center the raised surface portions 24-27 extend into concave surface portions 24A-27A which then extend to a cylindrical upper end of the aperture 18. Each recessed surface area 11A extends from cutting edge 16 at an increasing depth which at most amounts to H and then extends inwards at a decreasing depth. The decreasing depth is smallest close to the central aperture 18 as shown in FIG. 2. The maximum depth H of each recessed surface area 11A occurs along a midplane 2—2 of the inserts, and that depth could be of the same size as the width of clearance face 20 taken in the same cross-section. However, the size of depth H could also be different than the width of the face 20.

Further, the inner intersection line 28 between the concave surface portions 24A-27A, and the recessed surfaces 11A are in the shape of a wave-shaped line, as best appears from FIG. 1. This wave-shaped line 28 then extends to a straight line 29 which is the inner intersection of the raised surface portion 27. Thereafter, the line 29 intersects with another adjacent wave-shaped line 30, which provides the inner intersection line of recessed surface area 11B.

The insert is intended to be radially oriented in a milling cutter body 19 (see FIGS. 4-5) such that the upper face 11 serves as a chip face and the beveled portion of the side surface S is a clearance face. When the insert cuts through a workpiece in a direction of feed F during a milling operation, the secondary cutting edge 17'' is oriented parallel to the direction of feed and thus also is parallel to the plane $P_1$ of the cut being made in the workpiece (see FIG. 2A). The secondary edge portion 17'' thus generates the final surface WS in the workpiece along plane $P_1$. Furthermore, it is desired that the shoulder being cut by the insert be a ninety-degree shoulder, i.e., that the surface WS' shown in FIG. 2A be oriented at ninety degrees relative to the surface WS. In order to be able to cut such a ninety-degree shoulder by the insert 10 which has a real angle I greater than ninety degrees, the insert is mounted in the milling cutter in such fashion that the effective angle I' which is "seen" by the workpiece during a milling operation is ninety degrees. This is achieved by orienting the insert 10 at a negative radial angle $\alpha$ (see FIG. 4) and a positive axial angle $\beta$ in the cutter body 1. Accordingly, the effective angle I', seen by the workpiece (see FIG. 2A) can be made to be ninety degrees. Thus, in FIG. 2A, as the insert 10 moves toward the viewer during its rotation, the point $Q_1$ is located farther from the viewer than is the point $Q_2$, and the point $Q_3$ is located farther from the viewer than are both of points $Q_1$ and $Q_2$ (see also FIG. 5). The entering angle of the insert is from 90-95 degrees, preferably 90°-92°.

Since the main edge portion 16' extends at an angle relative to the secondary edge 16'', it is possible to provide the insert with four identical cutting corners capable of cutting a ninety-degree shoulder angle I'.

Figure 6:
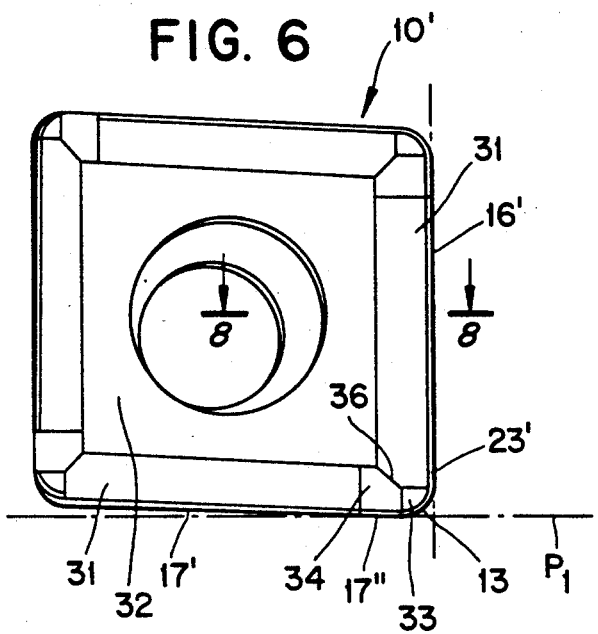
FIG. 6 is a top view of an insert according to an alternative embodiment of the invention.
Figure 7:
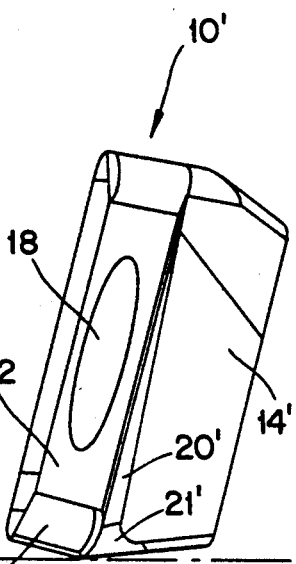
FIG. 7 is a side view of the insert in FIG. 6.
Figure 8:
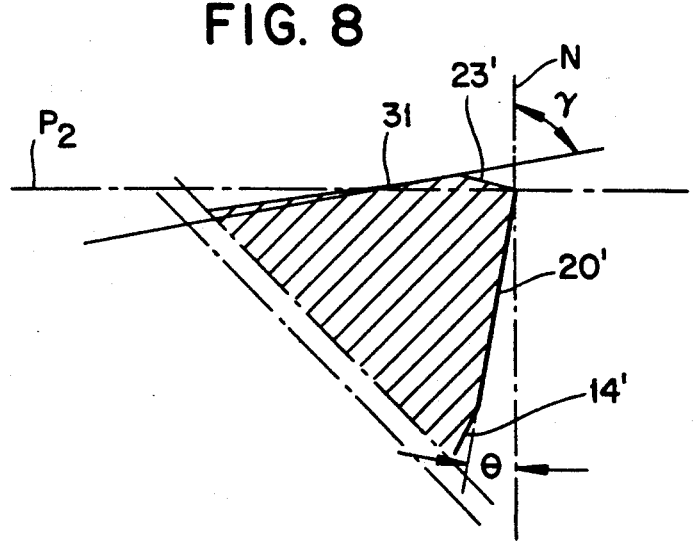
FIG. 8 is a partial cross-sectional view of the FIG. 6 insert taken along the line 8—8 in FIG. 6.

An alternative embodiment of the invention is shown in FIGS. 6-8. In similarity with FIGS. 1-5 the insert 10' is square-shaped with positive geometry. In this embodiment, the land area 23' along the cutting edge 16 includes an inner sloping wall 31 which extends downwards to a recessed planar surface 32 that is arranged parallel with the bottom surface 12 of the insert. The clearance angle $\theta$ between clearance face 20' and the normal N is in the range of 5°-25° at a midplane 8—8 of the insert (see FIG. 8). It is preferred that the smoothly rounded corner portion 21' has an extension, in the direction of thickness of the insert, that approximately is one-half of the total thickness of the insert, i.e., half the height of the edge surface 14'. It is to be understood, however, that other dimensions are possible.

The land 23' is inclined at an angle with respect to the plane $P_2$ and is of constant width along the entire main cutting edge 16'. The cutting edge 16' then extends into a corner radius, or alternatively into one or several facets at the corner. The upper chip face 33 of the corner portion is in the shape of a rounded recess. The land 23' also extends along the curved contour of the corner while having the same width as along the main cutting edge 16'. One side of the recess 33 intersects a planar surface 34 which slopes downwards from the secondary cutting edge 17" towards a central planar surface 32. Another side of the recess 33 intersects the sloping wall 31. Both sloping surfaces 31, 34 intersect each other to form an edge 36 which lies along the bisector of the corner 13.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A cutting insert for chip removing machining of metal workpieces, comprising a body having a polygonal upper chip face, a substantially planar bottom face, and side surfaces intersecting said chip face and corners of said insert and intersecting said chip face and said bottom face, cutting edges being formed by the intersection of said chip face with respective side surfaces, a lower portion of each side surface extending upwardly and outwardly from said bottom face, an upper portion of each side surface being beveled to form a planar clearance face which intersects a respective cutting edge, each clearance face being disposed between two adjacent corners and having a width extending in a direction transversely of said cutting edge, said width being largest adjacent one of said two corners and decreasing toward the other of said two corners, said insert including a strengthening land extending inwardly from said cutting edge, at least a portion of each clearance face located adjacent said one corner forming a substantially ninety degree angle with said plane.

2. A cutting insert according to claim 1, wherein said insert includes a strengthening land extending inwardly from said cutting edge.

3. A cutting insert according to claim 2, wherein said land lies in a plane, each of said clearance faces forming a substantially ninety degree angle with said plane.

4. A cutting insert according to claim 1, wherein a central portion of said chip face is recessed toward said bottom face, said chip face including descending walls extending downwardly from said lands to said recessed central portion, said descending walls being separated from one another by raised ribs, said ribs being situated adjacent respective corners and including upper surfaces lying in a common plane oriented parallel to said bottom face.

5. A cutting insert according to claim 1, wherein said bottom face is polygonal and being angularly displaced relative to said polygonal chip face as said insert is viewed in plan.

6. A cutting insert according to claim 1, wherein said cutting edges include main edge portions, corner edge portions, and secondary edge portions, each secondary edge portion interconnecting a main edge portion with a corner edge portion, said main edge portion being inclined inwardly relative to a respective secondary edge portion by a slight angle as said chip face is viewed in plan.

7. A cutting insert according to claim 6, wherein said angle is no greater than about four degrees.

8. A cutting insert according to claim 6, wherein a secondary edge portion located on one side of a corner forms an angle greater than ninety degrees with a main edge portion located on the other side of said corner.

9. A cutting insert according to claim 6, wherein each secondary edge portion is oriented parallel to a respective edge of said bottom face.

10. A cutting insert according to claim 6, wherein said insert has four said corners each adjoining a said secondary edge portion and a main edge portion.

11. A cutting insert according to claim 2, wherein said land has a maximum width at said corners.

12. A cutting insert according to claim 4, wherein said raised ribs are spaced from a bisector of a respective corner.

13. A cutting insert according to claim 10, wherein each of said ribs forms an acute angle with a respective corner bisector, said angle being no greater than twenty degrees.

14. A cutting insert according to claim 2, wherein said chip face includes a recessed central region including a recessed surface oriented parallel to said bottom face, and descending walls extending inwardly and downwardly from said land to said recessed surface.

15. A cutting insert according to claim 12, wherein said land lies in a plane parallel to said bottom face, each of said descending walls forms an angle with a plane extending perpendicularly to said plane, said angle being from 60-85 degrees.

16. A cutting insert according to claim 1, wherein said chip face is of generally square shape.

17. A cutting insert according to claim 1, wherein the wider end of each said clearance face extends around one of said corners and is smoothly rounded at such corner.

18. A milling cutter comprising a cutter body and a plurality of inserts mounted therein, each of said inserts comprising a body having a polygonal upper chip face, a substantially planar bottom face, and side surfaces intersecting one another to form corners of said insert and intersecting said chip face and said bottom face, cutting edges being formed by the intersection of said chip face with respective side surfaces, a lower portion of each side surface extending upwardly and outwardly from said bottom face, an upper portion of each side surface being beveled to form a planar clearance face which intersects a respective cutting edge, each clearance face being disposed between two adjacent corners and having a width extending in a direction transversely of said cutting edge, said width being largest adjacent one of said two corners and decreasing toward the other of said two corners, said inserts oriented to form a positive axial rake angle and a negative radial rake angle.

19. A milling cutter according to claim 18, Wherein said cutting edges include main edge portions, corner edge portions, and secondary edge portions, each secondary edge portion interconnecting a main edge portion with a corner edge portion, each of said corner edge portions adjoining a secondary edge portion of one cutting edge and a main edge portion of another cutting edge, said secondary and main edge portions at a respective corner forming therebetween an actual angle greater than ninety degrees, said positive axial rake angle and said negative radial rake angle being such that said secondary and main edge portions at a respective corner cut a ninety-degree shoulder in a workpiece.

20. A cutting insert for chip removing machining of metal workpieces, comprising a body having a polygonal upper chip face, a substantially planar bottom face, and side surfaces intersecting one another to form corners of said insert and intersecting said chip face and said bottom face, cutting edges being formed by the intersection of said chip face with respective side surfaces, a lower portion of each side surface extending upwardly and outwardly from said bottom face, an upper portion of each side surface being beveled to form a planar clearance face which intersects a respective cutting edge, each clearance face being disposed between two adjacent corners and having a width extending in a direction transversely of said cutting edge, said width being largest adjacent one of said two corners and decreasing toward the other of said two corners, said insert including a strengthening land extending inwardly form said cutting edge, a central portion of said chip face being recessed toward said bottom face, said chip face including descending walls extending downwardly from said lands to said recessed central portion, said descending walls being separated from one another by raised ribs, said ribs being situated adjacent respective corners and including upper surfaces lying in a common plane oriented parallel to said bottom face.

21. A cutting insert for chip removing machining of metal workpieces, comprising a body having a polygonal upper chip face, a substantially planar bottom face, and side surfaces intersecting one another to form corners of said insert and intersecting said chip face and said bottom face, cutting edges being formed by the intersection of said chip face with respective side surfaces, a lower portion of each side surface extending upwardly and outwardly from said bottom face, an upper portion of each side surface being beveled to form a planar clearance face which intersects a respective cutting edge, each clearance face being disposed between two adjacent corners and having a width extending in a direction transversely of said cutting edge, said width being largest adjacent one of said two corners and decreasing toward the other of said two corners, said bottom face being polygonal and being angularly displaced relative to said polygonal chip face as said insert is viewed in plan.

22. A cutting insert for chip removing machining of metal workpieces, comprising a body having a polygonal upper chip face, a substantially planar bottom face, and side surfaces intersecting gone another to form corners of said insert and intersecting said chip face and said bottom face, cutting edges being formed by the intersection of said chip face with respective side surfaces, a lower portion of each side surface extending upwardly and outwardly from said bottom face, an upper portion of each side surface being beveled to form a planar clearance face which intersects a respective cutting edge, each clearance face being disposed between two adjacent corners and having a width extending in a direction transversely of said cutting edge, said width being largest adjacent one of said two corners and decreasing toward the other of said two corners, said cutting edges including main edge portions, corner edge portions, and secondary edge portions, each secondary edge portion interconnecting a main edge portion with a corner edge portion, said main edge portion being inclined inwardly relative to a respective secondary edge portion by a slight angle as said chip face is viewed in plan.

23. A milling cutter comprising a cutter body and a plurality of inserts mounted therein, each of said inserts comprising a body having a polygonal upper chip face, a substantially planar bottom face, and side surfaces intersecting one another to form corners of said insert and intersecting said chip face and said bottom face, cutting edges being formed by the intersection of said chip face with respective side surfaces, a lower portion of each side surface extending upwardly and outwardly from said bottom face, an upper portion of each side surface being beveled to form a planar clearance face which intersects a respective cutting edge, each clearance face being disposed between two adjacent corners and having a width extending in a direction transversely of said cutting edge, said width being largest adjacent one of said two corners and decreasing toward the other of said two corners, said inserts oriented to form a positive axial rake angle and a negative radial rake angle, said cutting edges include main edge portions, corner edge portions, and secondary edge portions, each secondary edge portion interconnecting a main edge portion with a corner edge portion, each of said corner edge portions adjoining a secondary edge portion of one cutting edge and a main edge portion of another cutting edge, said secondary and main edge portions at a respective corner forming therebetween an actual angle greater than ninety degrees, said positive axial rake angle and said negative radial rake angle being such that said secondary and main edge portions at a respective corner cut a ninety-degree shoulder in a workpiece.

* * * * *